July 15, 1924.
H. M. LOFTON
1,501,055
PULVERIZER AND MULCHER
Filed Aug. 20, 1919
5 Sheets-Sheet 1
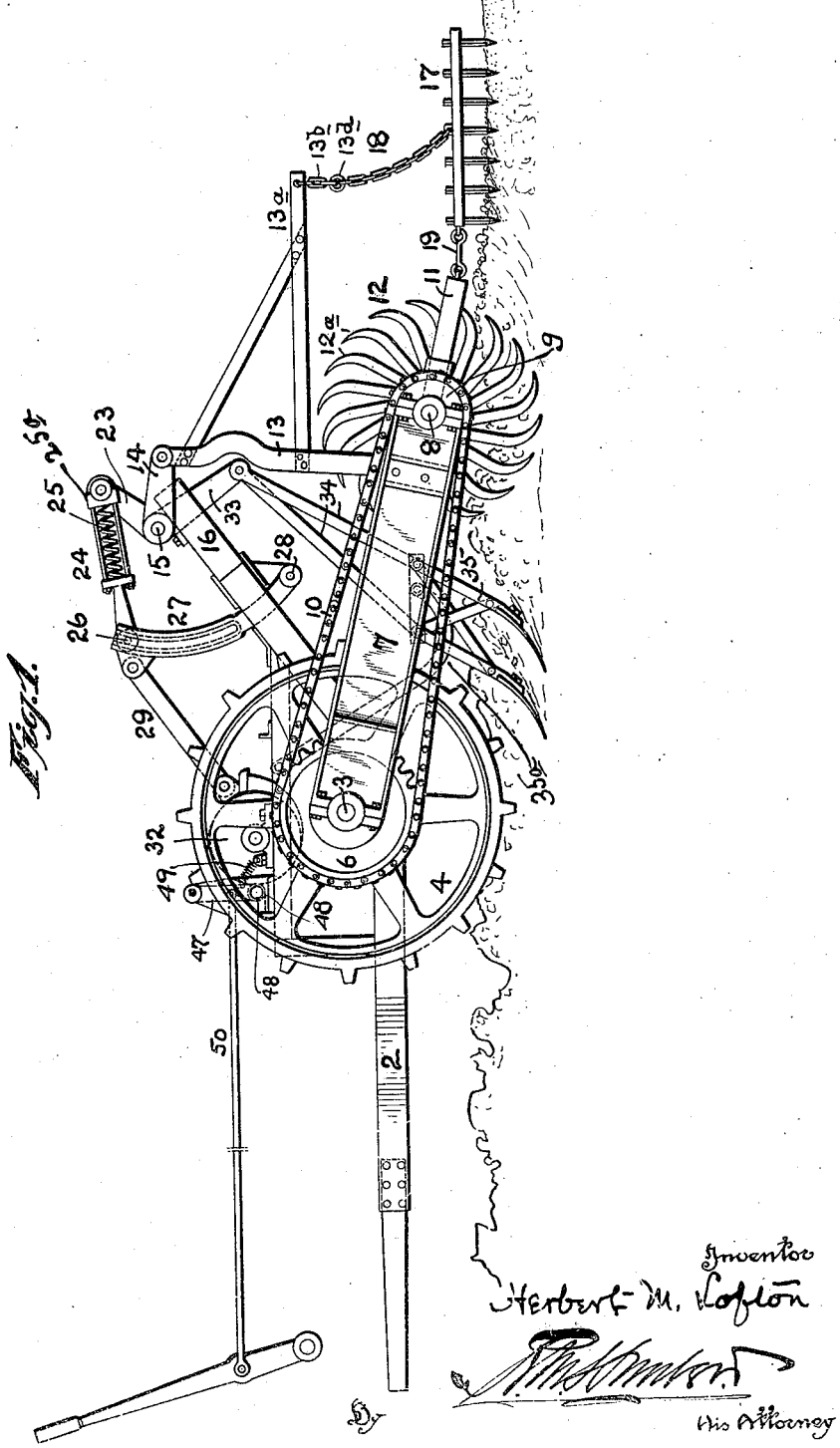

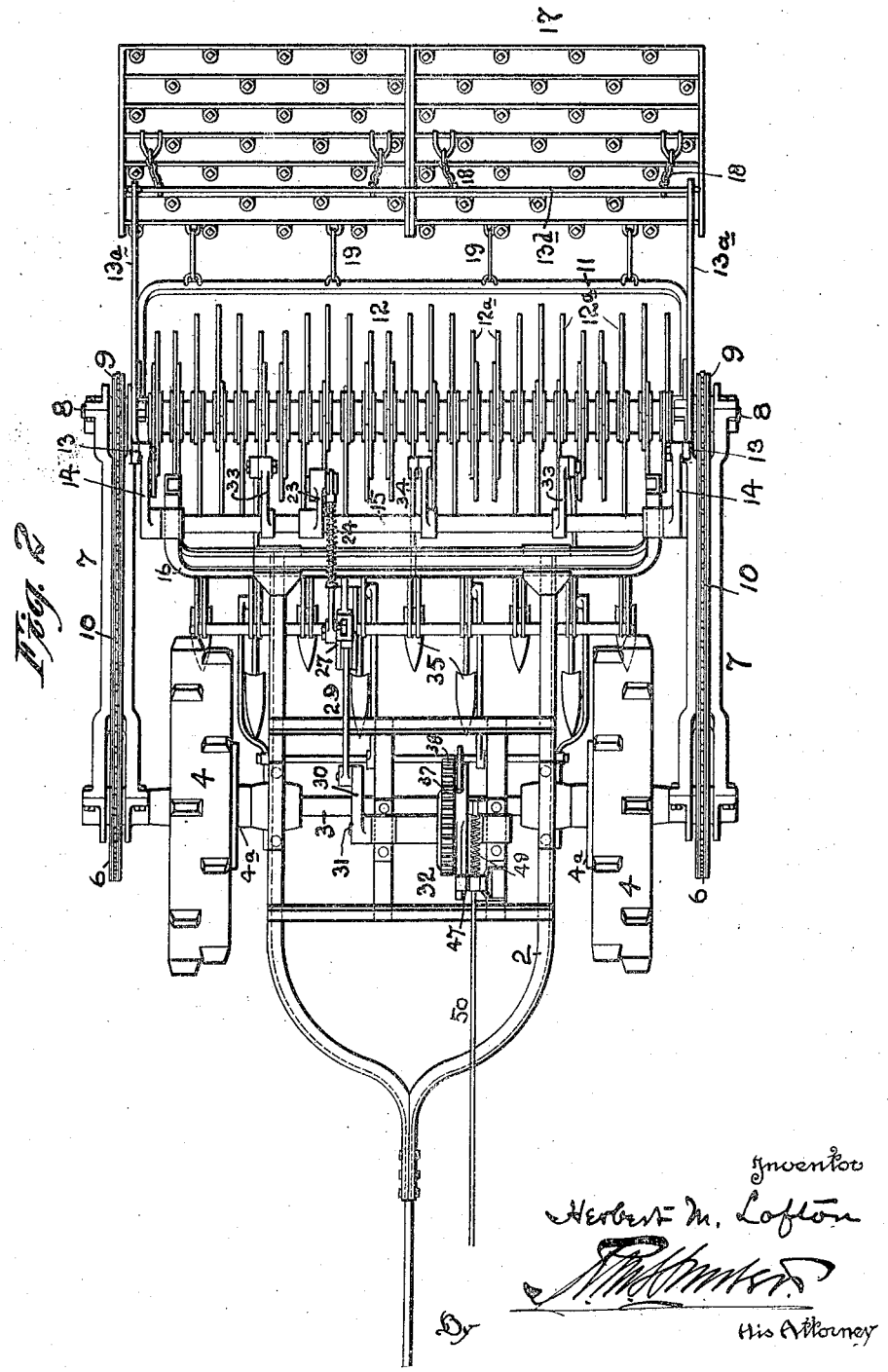

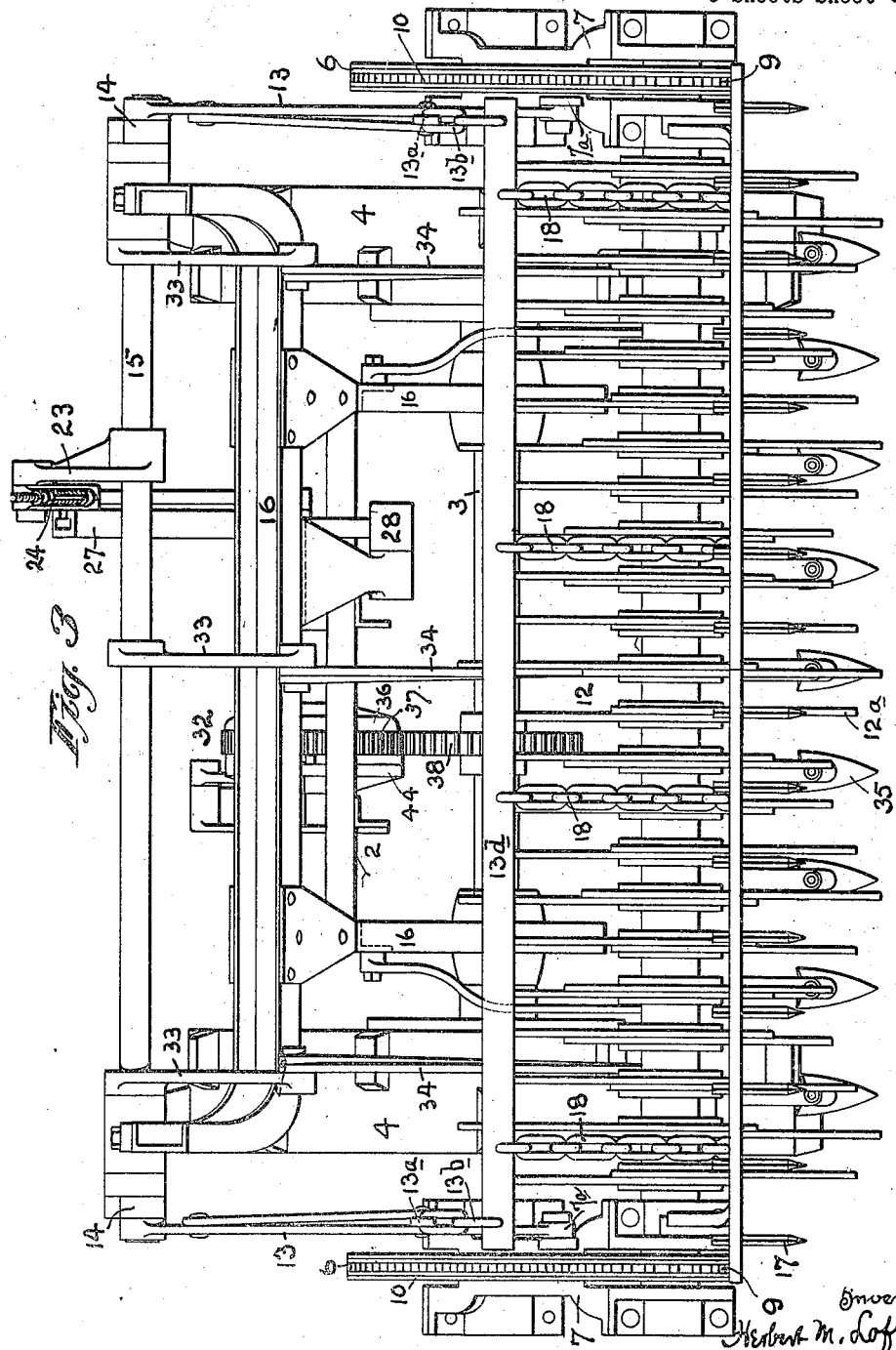

July 15, 1924.
H. M. LOFTON
PULVERIZER AND MULCHER
Filed Aug. 20, 1919    5 Sheets-Sheet 4
1,501,055
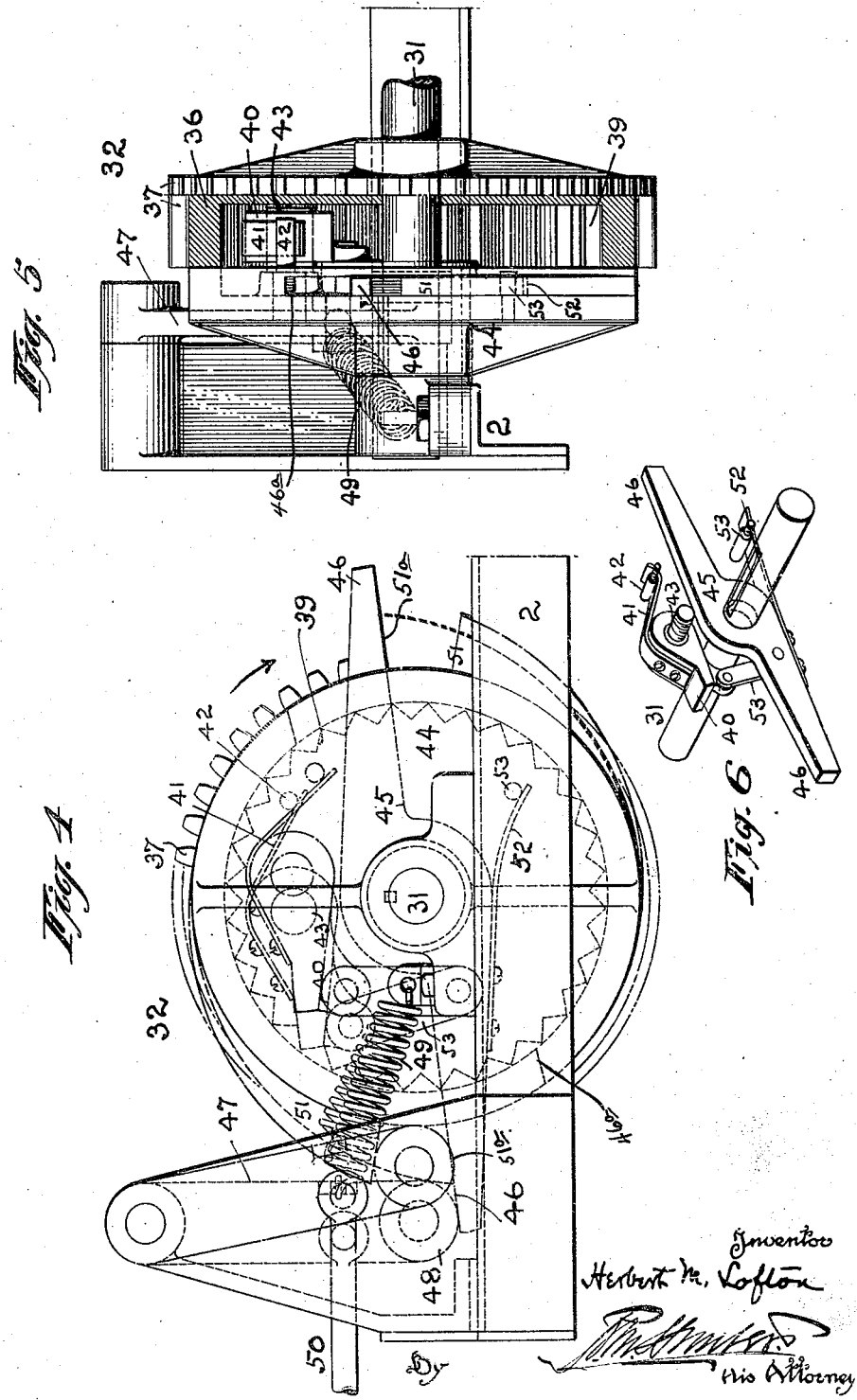

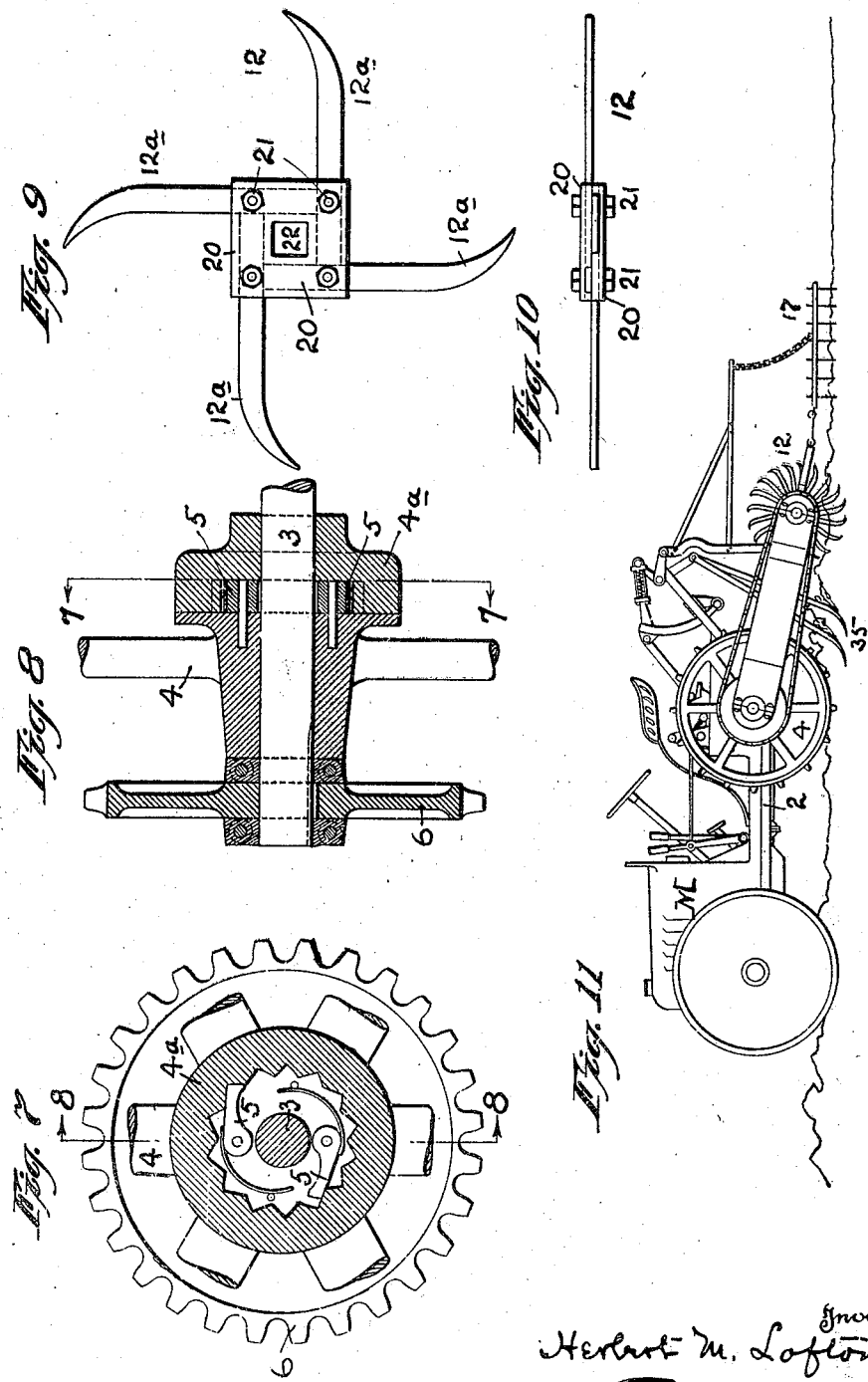

Patented July 15, 1924.

1,501,055

UNITED STATES PATENT OFFICE.

HERBERT M. LOFTON, OF CHATTANOOGA, TENNESSEE.

PULVERIZER AND MULCHER.

Application filed August 20, 1919. Serial No. 318,684.

*To all whom it may concern:*

Be it known that I, HERBERT M. LOFTON, a citizen of the United States, and resident of Chattanooga, county of Hamilton, and State of Tennessee, have invented an Improvement in Pulverizers and Mulchers, of which the following is a specification.

The object of my invention is to provide an agricultural machine which, in traveling once over the ground that has been previously "turned over" by heavy plows, will prepare the soil for planting, the preparation consisting in rapid successive treatments by coulters or ripper plows, by rotary mulcher or pulverizers and finally by a toothed harrow, the said machine adapted to be pulled by horses or tractors according to the size of the machine and the duty to be performed.

My object is further to provide the machine with power transmission means which will transmit the power from the main shaft having spiked supporting wheels, to the pulverizer shaft, and preferably also to the lifting means for automatically raising the coulter plows, mulcher or pulverizers and harrow, clear of the ground when desired, as for example during transportation when out of use.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawing the embodiment thereof which is at present preferred by me, since the same is in form to give satisfactory and reliable results, but it is to be understood that the several instrumentalities of which my invention consists can be variously arranged and organized and that my invention is not limited to the precise arrangement and organization of the instrumentalities herein shown and described.

Referring to the drawings: Fig. 1 is a side elevation of my improved pulverizer and mulcher; Fig. 2 is a plan view of the same; Fig. 3 is a rear elevation of the same; Fig. 4 is a side elevation of the lifting mechanism; Fig. 5 is an end view of the same with a portion in section; Fig. 6 is a perspective view illustrating the clutch devices of the structure of Figs. 4 and 5; Fig. 7 is a cross sectional view on line 7—7 of Fig. 8, showing the clutch gear between the main shaft and main supporting and drive wheels; Fig. 8 is a section view on line 8—8 of Fig. 7 in a plane lengthwise of the shaft of the clutch devices; Fig. 9 is a side elevation of one of the rotary pulverizers; Fig. 10 is a plan view of the same; and Fig. 11 is a side elevation showing my invention combined with motive powers so as to be self-propelled.

2 is the main frame and may be of any suitable construction so long as it is light and strong and has journaled therein the main driving shaft 3, to the ends of which are keyed the sprocket wheels 6. Journaled upon the shaft 3 between the sprocket wheels 6 and the main bearings are the spiked supporting and driving wheels 4 which carry pawls 5 engaging sprocket teeth in hubs $4^a$ (Figs. 7 and 8), secured to the shaft and by which the shaft may be driven in one direction only. This construction may be applied to one wheel 4 and shaft only if so desired, but by having it in connection with both wheels there is no lost or retard motion to the shaft 3 when the machine is turning to the right and to the left. It will also be understood that these pawls and ratchet connections act as a differential mechanism. 7 are frames hinged to the main shaft 3 adjacent to the sprocket wheels 6 and extend rearwardly and downwardly and have journaled in their rear ends the shaft 8 of the rotary mulcher or pulverizer 12. The ends of this shaft 8 are provided with sprocket wheels 9, 9, which are driven from the sprocket wheels 6, 6, by sprocket chains 10. By this means the rotary pulverizer 12 is definitely positioned to the rear of the main shaft, is driven therefrom, and is free to swing upward about said shaft when being lifted clear of the ground. The mulcher or pulverizer blades are shown at $12^a$ and are in sets of four clamped at right angles to each other in a two part frame 20 by bolts 21 (Figs. 9 and 10). The frame 20 has a square hole 22 which receives the square body of the pulverizer shaft 8. By reference to Figs. 2 and 3 it will be seen that there are enough of these pulverizer teeth sets to fill the space between two sprocket wheels 9, 9. They may be spaced apart by washers to enable the bolts 21 to just clear.

It will also be understood that, as shown in Fig. 1, the blades 12ᵃ of one set are to be staggered with respect to the adjacent sets, so that they in effect are arranged helically above the shaft; and consequently, there will be required four sets of the clamping castings or frames 20 with the holes 22 respectively advanced 22½ degrees to permit the blades to be helically arranged.

The two side frames 7 between the shafts 3 and 8 are connected at their rear ends by a cross frame 11 which extends back of the pulverizer 12 and cause the frames to act as a unitary frame. 17 is a staggered toothed harrow of any suitable construction, preferably of metal throughout and is connected to the cross frame 11 by links 19, so that while it is positively pulled along, the harrow is free to rise and fall and otherwise adapt itself to the ground.

In addition to the rotary mulcher or pulverizer and harrow above described, the machine is provided with a series of ripper plows 35 secured together so as to move as a unit and dragged along by the drag bars 35ᵃ. These ripper plows are suspended by links 34 from the rocker arms 33 secured to a rock shaft 15 journaled on the upper end of an upwardly extending part 16 of the main frame 2.

The rock shaft 15 is also provided with rocker arms 14 upon its ends, from which depend links 13, the lower ends of which are connected to the side frames 7 at 7ᵃ (Fig. 3). By this means the mulcher or pulverizer 12 may be suspended at the proper elevation and lifted when desired. These links 13 are provided with rearwardly extending arms 13ᵃ, from which is hung a cross bar 13ᵈ, by chains 13ᵇ. From the cross bar 13ᵈ there depends four chains 18, the lower ends of which are connected to the harrow 17 in such manner that it may be lifted bodily by the chains when the rock shaft 15 is rocked. When in operation upon the ground, the harrow is free from any influence of these chains 18.

The rock shaft 15 is provided with an arm 23, connected at its outer end with a link 24 whose free end 26 is guided in a groove in the arc shaped arm 27 hinged to the frame 16 at 28. This link 24 is nonextensible, but is provided with a spring 25 which permits its outer box 25ᵃ to be moved toward the other end 26 to temporarily shorten the working length of the link, which may be required when the soil treating parts such as the mulcher or ripper plows forcibly ride upward from any cause. The spring 25 may be said to apply a spring pressure upon these parts to hold them down to their work, with a reasonable degree of yieldingness to prevent breakage.

The arc shaped arm 27 is connected by a link 29 with a crank 30 (Fig. 2) on the end of the lifting shaft 31, which may be intermittently rotated a half revolution at a time to raise or to lower the soil operating elements, said rotation being effected by the lifting mechanism 32 and controlled by the operator by rod 50 (Figs. 1 and 2). This lifting mechanism is more fully illustrated in Figs. 4, 5 and 6 and will now be described. The lifting shaft 31 is keyed to a spider 44 and carries a housing 36 which is journaled upon the shaft 31 so as to rotate freely thereon; and said housing is provided on its periphery with gear teeth 37 which mesh with a gear 38 (Figs. 2 and 3) secured to the main shaft 3. In this manner the housing 36 is continuously rotating while the machine is in normal operation. The interior of the housing 36 is provided with internal ratchet teeth 39, which are engaged by the pivoted pawl 40 journaled on a pin 43 extending laterally from the spider 44 and spring pressed into engagement with the ratchet teeth by a spring 41 the free end of which presses against a pin 42 also extending from the spider 44. Loosely journaled upon the lifting shaft 31 within the housing and spider is a lever 45, which is linked to the pawl 40 by link 53 and has its free ends 46 extending radially beyond the perimeter of the spider 44, and moreover adapted to move in slotted portions therein. This lever 45 is provided with a flat spring 52 which presses upon a lateral pin 53 extending from the spider, said spring acting to permit oscillation of the lever when released to throw the pawl into engagement with the ratchet teeth of the housing.

When the pawl 40 engages the ratchet teeth, the spider and lifting shaft 31 are positively rotated; and they are controlled in the extent of this motion by the lever 47 and its roller 48 in their action upon the ends 46 of the pawl releasing lever 45. The lever 47 is held in operative engagement with the ends of the pawl releasing lever 45 by a spring 49 and moved out of engagement when desired by the hand operated rod 50. Keeping in mind that the housing 36 is rotating continuously while the machine is moving over the ground, it will be apparent that to hold the shaft 31 stationary, it is necessary that the pawl 40 shall be held out of engagement with the ratchet teeth 39, and this is accomplished while the crank 30 is in either of its two diametrically opposite positions, in the following manner. The spider 44, while of generally circular form, is nevertheless provided on diametrically opposite parts with eccentric or cam shaped ribs 51 which gradually push the roller 48 outward against the action of spring 49, so that when the end 46 of the lever 45 is rotated upwardly and strikes the roller, said lever is held stationary while the spider and with it the pawl 40, continues to rotate a little further or just sufficient to cause the pawl 40 to be pulled out of engagement with the ratchet teeth 39. At this same instant the wide edge 51ª of the rib 51 will have advanced away from the end 46 of the lever 45 and permit the roller 48 to be drawn into the gap by the spring 49. This locks the spider from further movement and holds the pawl 40 out of engagement with the ratchet teeth. In this position the crank 30 will be in position shown in Figs. 1 and 2 and with the ripper plows, mulcher or pulverizer, and the harrow all in lowered position for working the earth. This condition will continue until the rod 50 is pulled and the roller 48, not only drawn to the position shown in Fig. 1, but entirely clear of the lever end 46, with the result that the lever 45 flies forward under the impulse of its spring 52 and forces the pawl 40 into engagement with the ratchet teeth 39. Thereupon the spider 44 and lifter shaft 31 begins to rotate with housing 36. As soon as the arm 46 has passed roller 48, the latter is permitted to be pulled inward and then as the spider rotates further, the next eccentric rib 51 is brought into play moving the roller to the position shown in Fig. 4, when the lever 45 is arrested and the spider and its pawl advanced as before. Once more the roller is snapped into the space between the end 51ª of the eccentric rib 51 and the arm 46 and arrests and locks the spider and with it the lifting shaft 31. This action will bring the crank 30 to a position diametrically opposite to that shown in Figs. 1 and 2, and with the result that rock shaft 15 is rocked and the ripper plows, the mulcher or pulverizer and harrow are bodily lifted out of operative relation with the earth and held suspended so that the machine may be transported from the field to the barn.

In Fig. 4, the parts are in the position when the roller 48 has been acted upon by the rib 51 and the beginning of the disengagement of the pawl 40 is just about to begin. When the disengagement has taken place the parts, including the spider and pawl, have advanced to the dotted position. When this advanced position is reached, the end of the slot 46ª will have been brought into contact with the arm 46 and this positively arrests any further rotation of the spider.

In some cases it is not desired that the plows 35 and mulcher 12 shall be permitted to enter to so great a depth as shown in Fig. 1; and to reduce this penetration, the end 26 of the link 24 is adjusted further down the slotted rocker arm 27, whose curvature is somewhat eccentric to the shaft 15 and especially so with respect to the outer end of the arm 23 to which the link 24 is hinged. When this adjustment is made, it is possible that the implements may not be wholly clear of the ground when the crank 30 is moved to lifting position, but this is easily adjusted back again to position shown in Fig. 1 before transportation is to be made.

The machine as illustrated in Figs. 1, 2 and 3 is intended to be drawn by horses or to be pulled by any suitable tractor, whereas in Fig. 11, I have shown my machine as self propelled, and do not limit myself in these respects.

In the general construction, I have shown the use of simple and inexpensive mechanisms for the organized machine and it is to be understood these are only illustrated by way of example and are not to be taken as restrictions of the extent of my improvements.

The labor saving by use of my improved mulcher and pulverizer is large, because after the land has been "turned over" by heavy plows, it is only necessary for my improved machine to be moved over it once, the rough clods of earth being broken and loosened by the coulter or ripper plows and pulverized by the rotary mulcher followed by the pulverizing and leveling harrow. Under the old practice, it was necessary to go over the ground several times, requiring the plowed soil to be subjected to a double disc harrow treatment from two or four times, and subsequently toothed harrow treatment from two or three times, thus making the expense very great and the loss of time very objectionable as it comes just at the planting season. By use of my machine, a single treatment alone is necessary, since it leaves a perfectly pulverized and mulched surface ready for planting. In the old method the rotary double disc harrows plow only to a depth of three or four inches, the shallowness of which is objectionable. By use of my invention I am enabled to pulverize and mulch to a much greater depth and thereby so condition the earth that it will hold moisture in the lower strata of the soil, a special advantage during the "dry" season.

It will now be apparent that I have devised a novel and useful construction which embodies the features of advantage enumerated as desirable, and while I have in the present instance shown and described the preferred embodiment thereof, which has been found in practice to give satisfactory and reliable results, it is to be understood that I do not restrict myself to the details, as the same are susceptible of modification in various particulars without departing from the spirit or scope of the invention.

Having now described my invention what I claim as new and desire to secure by Letters Patent, is:

1. In a machine of the character stated, a main frame having a driving shaft and supporting wheels for rotating it, combined with means for mulching and pulverizing the soil, means for raising and lowering the said mulching and pulverizing means as required, the means for raising and lowering the means for mulching and pulverizing consisting of a crank, means for rotating the crank from the main shaft, means for arresting the crank in diametrically opposite positions and disconnecting the means for rotating it, whereby it may be held in lifting or lowering positions as required, and hand controlled means for putting the rotating means into and out of connection with the lifting and lowering crank.

2. In a machine of the character stated, a main frame having a driving shaft and supporting wheels for rotating it, combined with means for mulching and pulverizing the soil, means for raising and lowering the said mulching and pulverizing means as required, in which the means for raising and lowering the means for mulching and pulverizing consists of a rotary lifting shaft and crank, connecting means from the crank to the means for mulching and pulverizing, a rotary ratchet frame journaled on the lifting shaft and driven from the main shaft, means having a pawl secured to the lifting shaft and rotating with it, and hand controlled means for putting the pawl into or out of engagement with the ratchet teeth and holding the lifting shaft and its crank in definite positions for raising or lowering the mulching and pulverizing means as may be required.

3. In a machine of the character stated, the combination of a main frame, a main shaft and supporting wheel by which it is driven said shaft and wheels including a differential means to permit the driving wheels to rotate at different speeds when necessary, a mulcher and pulverizer hingedly supported to the rear of the main shaft and driven therefrom, ripper plows arranged in advance of the mulcher and pulverizer, and common means for simultaneously raising and lowering the plows and mulcher and pulverizer relatively to the main frame.

4. In a machine of the character stated, a main frame having a driving shaft and supporting wheels for rotating it, combined with means for mulching and pulverizing the soil, means for raising and lowering the said mulching and pulverizing means as required, said raising and lowering means comprising power devices driven from the main driving shaft for positively raising the mulching and pulverizing means a definite distance and then automatically holding them in said elevated position, and hand controlled devices for timing the operation of the power devices, whereby they will raise the mulching and pulverizing means when required.

5. The invention according to claim 4, wherein further manually adjustable devices are provided to vary the extent of raising of the mulching and pulverizing means under the action of the power devices before being held in elevated position.

6. The invention according to claim 4, wherein the machine is further provided with ripper plows arranged in advance of the mulcher and pulverizer, and supporting and connecting means, whereby said ripper plows are automatically raised and lowered in accordance and simultaneously with the mulching and pulverizing means.

7. The invention according to claim 5, wherein the machine is further provided with ripper plows arranged in advance of the mulcher and pulverizer, and supporting and connecting means, whereby said ripper plows are automatically raised and lowered in accordance and simultaneously with the mulching and pulverizing means.

8. The invention according to claim 5, wherein the manually adjustable devices between the power devices and the mulching and pulverizing means consists of a rocking segment arranged to be rocked by the power devices, a pivoted crank mechanism for raising and lowering the mulching and pulverizing means, and an adjustable connection between the crank mechanism and the segment whereby movement of the crank mechanism may be increased or decreased while maintaining a uniform extent of movement of the pivoted segment.

9. The invention according to claim 4, further characterized by having the raising and lowering means provided with a spring device for yieldingly pressing the mulching and pulverizing means toward the ground.

10. In a machine of the character stated, a main frame having a driving shaft and supporting wheels for rotating it, combined with means for plowing the soil, means for raising and lowering the said plowing means as required, said raising and lowering means comprising power devices driven from the main driving shaft for positively raising and lowering the plowing means predetermined definite distances, and hand controlled devices for timing the operation of the power devices, whereby they will automatically raise or lower the plowing means when required.

11. The invention according to claim 10, wherein further manually adjustable devices are provided to vary the mechanical adjustments of the plowing means under the action of the power devices.

12. In a machine of the character stated, a main frame having a driving shaft and supporting wheels for rotating it, combined with means for mulching and pulverizing the soil, means for raising and lowering said mulching and pulverizing means when required and comprising power devices driven from the main driving shaft for positively raising and lowering the mulching and pulverizing means a definite distance upward from the lowermost position and a definite distance downward from the highest position and automatically sustaining said mulching and pulverizing means at the definite elevations so given, and hand controlled devices for timing the operation of the power devices whereby the mulching and pulverizing means may be automatically raised a predetermined definite distance by the power devices when required and reversely may be automatically lowered by the power devices a predetermined distance when operation on the soil is to be done.

13. The invention according to claim 12, wherein manual adjustable means are provided between the power devices and the mulching and pulverizing means for changing the extent of lifting and lowering of the mulching and pulverizing means by the power devices.

14. The invention according to claim 12, wherein further there is interposed between the power devices and the mulching and pulverizing devices yielding connections which permit the mulching and pulverizing devices to have a yielding upward movement in the event of meeting an obstruction in the ground but without affecting the power devices or the manually controlled devices.

15. In a machine of the character stated, a main frame having a driving shaft and supporting wheels for rotating it, combined with a harrow, means for raising and lowering said harrow when required comprising power devices driven from the main driving shaft for positively raising and lowering the harrow predetermined definite distances, and hand controlled devices for timing the operation of the power devices whereby the harrow may be automatically lowered by the power devices a predetermined distance when operation on the soil is to be done.

In testimony of which invention, I hereunto set my hand.

HERBERT M. LOFTON.